US007564475B1

(12) United States Patent
Mizes

(10) Patent No.: US 7,564,475 B1
(45) Date of Patent: Jul. 21, 2009

(54) COMPENSATION OF HIGH FREQUENCY BANDING IN PRINTING SYSTEMS

(75) Inventor: Howard A. Mizes, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1 day.

(21) Appl. No.: 12/057,706

(22) Filed: Mar. 28, 2008

(51) Int. Cl.
*B41J 2/47* (2006.01)
*H04N 1/409* (2006.01)

(52) U.S. Cl. ..................... 347/253; 358/3.26

(58) Field of Classification Search ............. 347/237, 347/238, 240, 251–254; 358/1.9, 3.06, 3.26, 358/463, 504
See application file for complete search history.

(56) References Cited

U.S. PATENT DOCUMENTS

| | | | |
|---|---|---|---|
| 4,746,940 A | 5/1988 | Lee | |
| 4,884,083 A | 11/1989 | Loce | |
| 4,989,019 A | 1/1991 | Loce | |
| 5,248,997 A | 9/1993 | Summers | |
| 5,315,322 A | 5/1994 | Bannai | |
| 5,323,179 A * | 6/1994 | Sanger et al. | 347/237 |
| 5,729,277 A | 3/1998 | Morrison | |
| 5,760,817 A | 6/1998 | Foote | |
| 5,900,901 A | 5/1999 | Costanza | |
| 5,920,336 A | 7/1999 | Lawton | |
| 6,023,286 A | 2/2000 | Nowak | |
| 6,025,922 A | 2/2000 | Marsden | |
| 6,055,005 A | 4/2000 | Appel | |
| 6,057,867 A | 5/2000 | Chan | |
| 6,819,352 B2 | 11/2004 | Mizes et al. | |
| 7,382,507 B2 * | 6/2008 | Wu | 358/523 |
| 2002/0159791 A1 | 10/2002 | Chen | |
| 2003/0231350 A1 * | 12/2003 | Yamagishi | 358/3.06 |
| 2005/0275855 A1 | 12/2005 | Mizes et al. | |
| 2007/0052991 A1 | 3/2007 | Goodman et al. | |
| 2009/0046325 A1 * | 2/2009 | Paul et al. | 358/3.26 |

OTHER PUBLICATIONS

U.S. Appl. No. 10/793,902, filed Mar. 8, 2004, Mizes et al.
U.S. Appl. No. 10/852,243, filed May 25, 2004, Mizes et al.
U.S. Appl. No. 10/917,676, filed Aug. 13, 2004, Lofthus et al.

(Continued)

*Primary Examiner*—Hai C Pham
(74) *Attorney, Agent, or Firm*—Fay Sharpe LLP

(57) ABSTRACT

A test pattern is written using multiple image beams in a non image zone at set time intervals. The test pattern is sensed and a profile of each beam is determined from the multiple image beams. A minimum reflectance of the profile is determined from the test pattern of each beam thereby providing an exposure of each respective beam. A centroid of a profile is determined from the test pattern of each beam thereby providing a position of each respective beam. At least one of the following is then determined: frequency, amplitude and phase of banding, which is inherent in a printing device, based on the sensed test pattern. A plurality of groups of image beams intensity changes is combined wherein each group is separated by a set displacement. A banding profile is determined from the group beam intensities. At least one banding compensation metric is determined based at least on one of the determined frequency, amplitude and phase of banding. Beam intensity changes are adjusted based on the determined banding compensation metric to compensate the banding inherent in the printing device.

20 Claims, 7 Drawing Sheets

OTHER PUBLICATIONS

U.S. Appl. No. 10/999,326, filed Nov. 30, 2004, Grace et al.
U.S. Appl. No. 11/084,280, filed Mar. 18, 2005, Mizes et al.
U.S. Appl. No. 11/090,502, filed Mar. 25, 2005, Mongeon.
U.S. Appl. No. 11/095,378, filed Mar. 31, 2005, Moore et al.
U.S. Appl. No. 11/109,558, filed Apr. 19, 2005, Furst et al.
U.S. Appl. No. 11/115,766, filed Apr. 27, 2005, Grace.
U.S. Appl. No. 11/170,873, filed Jun. 30, 2005, Klassen.
U.S. Appl. No. 11/189,371, filed Jul. 26, 2005, Moore.

* cited by examiner

COMPENSATION OF HIGH FREQUENCY BANDING IN PRINTING SYSTEMS

BACKGROUND

High image quality and high speed xerography requires imagers that can expose the photoreceptor with high resolution. A multi-beam raster optical scanner (ROS) provides a technique to achieve higher addressability and throughput. Multi-beam ROS's simultaneously sweep many beams across the photoreceptor and these beams can be more closely spaced than print engines with one beam. However, it is difficult to manufacture multi-beam ROS's with uniform beam spacing and exposure. The variation in beam spacing and exposure leads to differential development from each beam and objectionable high frequency banding.

In electro-photographic marking, a latent image is created by selectively discharging a photoreceptor. One way to selectively discharge a photoreceptor is to sweep a beam repeatedly across the photoreceptor as it moves relative to the beam. An image is written by turning the light on and off in the desired pattern. The image will be subsequently developed with toner and transferred to paper.

For an imager that sweeps a single beam across the photoreceptor, the addressability in the cross process direction is determined by how fast the beam can be turned on and off. The addressability in the process direction is determined by how far the photoreceptor moves between sweeps of the beam.

Image quality can be improved by increasing the addressability of the imager. Specifically, 2400 spots per inch (spi) images can be of higher quality than 600 spi images. Higher addressability will improve uniformity and density stability of the highlights and midtones. High addressability images will be more robust to marking process variations. A tone reproduction curve (TRC) may have less contouring and there can be more flexibility in a halftone design.

One way to achieve high addressability is to sweep more than one beam simultaneously across the photoreceptor. One way to generate multiple beams is through use of a vertical cavity self emitting laser (VCSEL). A VCSEL ROS consists of an array of diode lasers that emit light vertically from the chip. The beams can be focused so that they will sweep a series of parallel swaths across the photoreceptor.

CROSS REFERENCE TO RELATED APPLICATIONS

The following applications, the disclosures of each being totally incorporated herein by reference are mentioned:

U.S. application Ser. No. 10/793,902, filed Mar. 8, 2004, entitled "METHOD AND APPARATUS FOR CONTROLLING NON-UNIFORM BANDING AND RESIDUAL TONER DENSITY USING FEEDBACK SYSTEM," by Howard A. Mizes, et al.;

U.S. application Ser. No. 10/852,243, filed May 25, 2004, entitled "MEASUREMENT AND CONTROL OF HIGH FREQUENCY BANDING IN A MARKING SYSTEM," by Howard A. Mizes, et al.;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/109,558, filed Apr. 19, 2005, entitled "SYSTEMS AND METHODS FOR REDUCING IMAGE REGISTRATION ERRORS," by Michael R. Furst et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/170,873, filed Jun. 30, 2005, entitled "COLOR CHARACTERIZATION OR CALIBRATION PATTERNS WITH NOISE-DEPENDENT PATCH SIZE OR NUMBER", by R. Victor Klassen; and U.S. application Ser. No. 11/189,371, filed Jul. 26, 2005, entitled "PRINTING SYSTEM", by Steven R. Moore et al.

U.S. Pat. No. 5,900,901 to Costanza, issued May 1999, entitled "Method and apparatus for compensating for raster position errors in output scanners."

U.S. Pat. No. 4,746,940 to Lee, entitled "Line scanner to reduce banding," issued May 1988, describes a control system for an electrophotographic exposure apparatus which is characterized by a film sheet transport which carries a film sheet past a first and a second spaced position where at the same portion of the film sheet is exposed to an imaging beam each having the same image information.

U.S. Pat. No. 4,884,083 to Loce, entitled "Printer compensated for vibration-generated scan line errors," issued November 1989, describes a printing system employing a raster output scanning device that is compensated for the effects of motion of the medium upon which an image is being printed.

U.S. Pat. No. 4,989,019 to Loce, entitled "Multi-beam scanning system compensated for banding, issued January 1991, describes a multi-beam laser ROS print system which is adapted to minimize banding in output prints.

U.S. Pat. No. 5,315,322 to Bannai, entitled "Image forming apparatus with anti-banding implementation," issued May 1994, describes an electrophotographic copier, laser printer, facsimile transceiver or similar image forming apparatus of the type having a rotary polygonal mirror.

U.S. Pat. No. 5,248,997 to Summers, entitled "Facet reflectance correction in a polygon scanner," issued Sep. 1993, describes a technique for correcting facet reflectance differences to effect uniform laser light power output for all scanner facets in a laser imaging apparatus which includes a multi-faceted polygon scanner.

U.S. Pat. No. 5,729,277 to Morrison, issued Mar. 1998, entitled "System and method for modifying an output image signal to compensate for drum velocity variations in a laser printer," describes a system and method of correcting aberrations in an output image of an image transfer apparatus, the aberrations being due to variations in a velocity of a scanning surface in the image transfer apparatus.

U.S. Pat. No. 5,760,817 to Foote, issued June 1998, entitled "Laser printer with apparatus to reduce banding by servo adjustment of a scanned laser beam," issued June 1998 describes a print apparatus which includes a photoconductor and a mechanical system for moving the photoconductor past a scan line exposure station.

U.S. Pat. No. 5,920,336 to Lawton, issued July 1999, entitled "Beam deflecting for resolution enhancement and banding reduction in a laser printer," describes a system and method of deflecting a laser beam in a laser printer for providing enhanced resolution and reduced banding effects.

U.S. Pat. No. 6,023,286 to Nowak, entitled "Moving mirror motion quality compensation," issued Feb. 8, 2000 describes correcting motion quality induced color banding problems resulting from photoreceptor motion defects in a color imaging device having a laser based multifaceted polygon and a rotating cylindrical mirror whose rotation is set by a controlled rotation inducing element.

U.S. Pat. No. 6,025,922 to Marsden, entitled "Reduction of banding in printed images," issued February 2000, describes a method and apparatus for adding pseudo-random noise and bias to an input pixel value to reduce banding effects and to produce additional highlights in the output.

U.S. Pat. No. 6,057,867 to Chan, entitled "Laser printer with piezoelectric apparatus to reduce banding by adjustment of a scanned laser beam," describes a print apparatus which includes a photoconductor and a mechanical system for moving the photoconductor past a scan line exposure station.

U.S. Pat. No. 6,055,005 to Appel, entitled "Color printer with jitter signature matching", issued Apr. 25, 2000 describes correcting color banding problems resulting from facet-to-facet jitter in a color imaging device having a multifaceted polygon are corrected by starting each color separation using the same facet.

US Patent Application Publication No. 20020159791 to Chen, entitled "Systems and methods for reducing banding artifact in electrophotographic devices using drum velocity control", published Oct. 31, 2002, describes an electrophotographic device which uses a closed loop controller that receives a feedback signal from an encoder connected to the OPC drum to improve the rotational velocity control of the drum.

SUMMARY OF THE DISCLOSURE

The present disclosure provides a method comprising: writing a test pattern using multiple image beams in a non image zone at set time intervals; sensing the test pattern; determining a profile of each beam from the multiple image beams; determining a minimum reflectance of the profile from the test pattern of each the beam thereby providing an exposure of each respective the beam; determining a centroid of a profile from the test pattern of each the beam thereby providing a position of each respective the beam; determining at least one of frequency, amplitude and phase of banding, which is inherent in a printing device, based on the sensed test pattern; combining a plurality of groups of image beams intensity changes wherein each group is separated by a set displacement; determining a banding profile from the group beam intensities; determining at least one banding compensation metric based at least on one of the determined frequency, amplitude and phase of banding; and adjusting beam intensity changes based on the determined banding compensation metric to compensate the banding inherent in the printing device.

The present disclosure also provides a method comprising: writing a test pattern using multiple image beams in a non image zone at set time intervals; sensing the test pattern; determining a profile of each beam from the multiple image beams; determining a minimum reflectance of a profile from the test pattern of each the beam thereby providing an exposure of each respective the beam; determining a centroid of a profile from the test pattern of each the beam thereby providing a position of each respective the beam; determining at least one of frequency, amplitude and phase of banding which is inherent in a printing device, based on the sensed test pattern; combining a plurality of groups of image beams intensity changes wherein each group is separated by a set displacement; determining a banding profile from the group beam intensities; determining at least one banding compensation metric based on at least one of the determined frequency, amplitude and phase of banding; determining at least one banding compensation parameter based at least on one of the determined frequency, amplitude and phase of banding, wherein each compensation parameter is one of four different exposures; and, adjusting characteristics of producing an image based on the determined banding compensation parameter to compensate the banding inherent in the printing device.

DETAILED DESCRIPTION

An imager with multiple beams has an additional noise source: variations in the beam exposure and variations in the beam to beam spacing. Variations in the beam exposure can be due to efficiency of the emitter and variations in the spot size. Variations in the beam spacing can be due to variations in the angle of emission and errors in the alignment of the VCSEL chip. These noises can lead to an objectionable high frequency banding in the image.

One approach to minimize the high frequency banding is to design the VCSEL ROS to high specifications. The manufacture of the VCSEL chip and its integration with the optics can be made to meet the requirements of no objectionable high frequency banding. This approach lowers the successful yield of product and increases the cost as high quality instrumentation is needed.

Another approach is to compensate any intrinsic error by inducing an exposure variation that offsets the intrinsic one. This approach is described in the United States Patent Application 20070052991, "Methods and systems for determining banding compensation parameters in printing systems", by Nancy Goodman, Robert Loce, Bill Nowak, Howard Mizes, Peter Paul, Beilei Xu, Wencheng Wu, and Jack LeStrange.

This approach is appropriate to a single or dual beam ROS where the source of high frequency noise is due to imperfections in the polygon facet. In this approach, a test target or pattern is written at set time intervals and the frequency, phase, and amplitude of the banding is sensed. One way to sense the banding is to scan a test pattern and to extract a profile of print density vs. position in the process direction. From this measurement, a table of exposures that modify the ROS intensity for each scan line is determined.

In the approach described in the above patent application, it is assumed that the beam exposure can be set to one of many possible values for each sweep of the beam. In other words, there is no quantization limit.

High frequency banding of this sort can be compensated by introducing an intentional exposure variation. Sections of the swath where the beam spacing and exposure gives too little development, the beam can be made brighter to increase development. However, due to constraints in the electronics, each beam may not have enough independent exposure settings to give the desired compensation. More specifically, changing the beam exposure by a single level may change too little development into too much development.

The present disclosure describes a way to compensate when the beam intensities are constrained to a few adjustable levels. The banding is monitored by measuring the exposure and spacing of individual beams. Because of the high addressability of the VCSEL ROS, there will be noise at both low frequencies (perceivable) and high frequencies (unperceivable). The quantized compensating exposure settings are chosen to eliminate the low frequency noise, perhaps at the expense of the high frequency noise.

Figure 1:
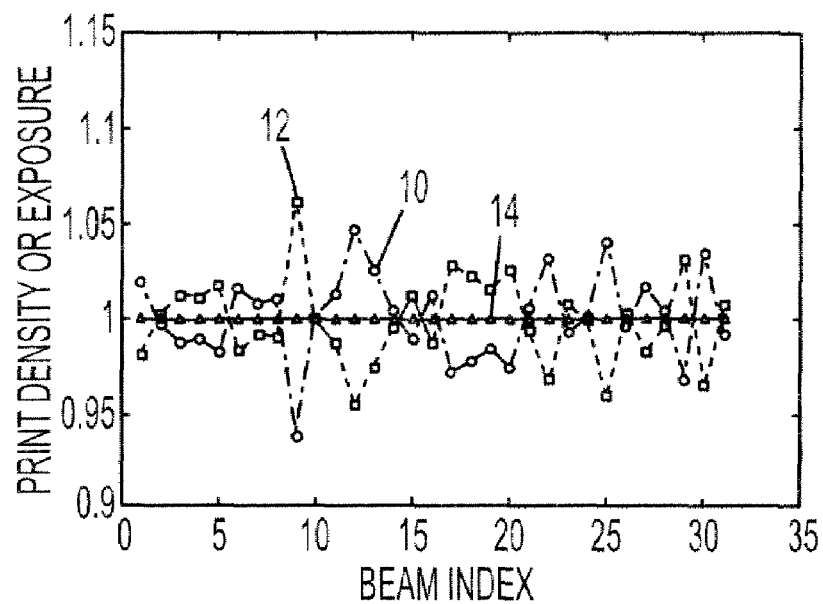
FIG. 1 displays the effect of compensation without exposure quantization.
Figure 2:
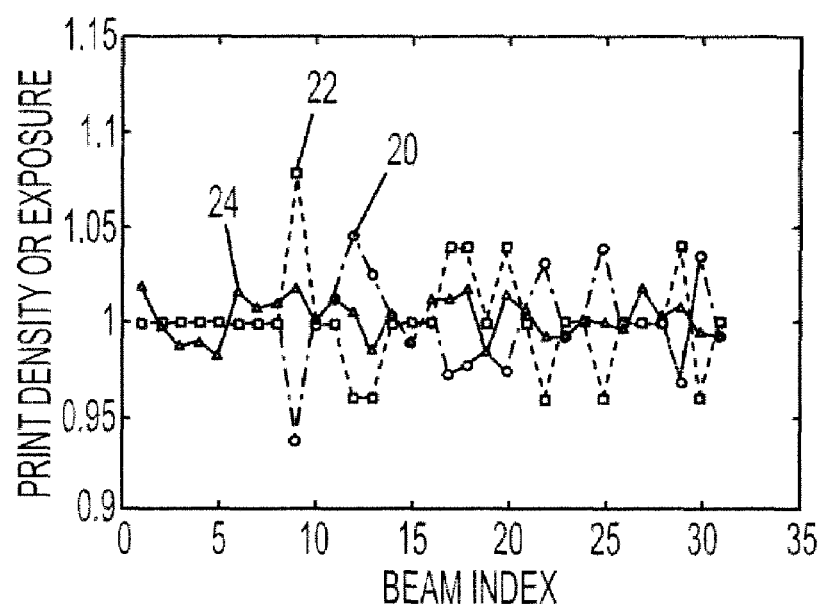
FIG. 2 displays the effect of compensation with exposure quantization at exemplary levels.

Under some circumstances, design constraints may limit the number of independent exposures that can be applied to each beam. For example, in one design of the VCSEL ROS there are 31 beams and each beam can only take on one of four different exposures. This may lead to an imperfect compensation as illustrated in FIG. 1. In FIG. 1, the density profile is shown in line 10 and the compensating exposure is shown in line 12. The resultant print density after the compensation is the difference between the two and is shown in line 14 and is flat. In FIG. 2, another density profile is shown in line 20 and assume that the compensating exposures, line 22, can take on only one of four values (i.e. 1.08, 1.04, 1.00, and 0.96). The compensated signal, line 24, is then not flat and there can be some level of residual banding, depending on the degree of the quantization.

The present disclosure takes advantage that the addressability of the sensor is much greater than the resolution of the eye. As shown in FIG. 2, if there are only four (4) adjustable levels, then the amplitude is too highly quantized to introduce a compensating signal. However, for a 31 beam ROS, there are $4^{31} = 10^8$ different combinations of exposure profiles that can be applied. With so many different combinations, there is likely to be one that can compensate the perceptible banding. The fundamental frequency is the inverse of the swath width, or 1.52 cycles/mm. Only that frequency and the first harmonic at 3.04 cycles/mm will be perceptible. Compensating this noise may introduce more noise at the higher frequencies, but this high frequency banding will not be perceptible.

Figure 3:
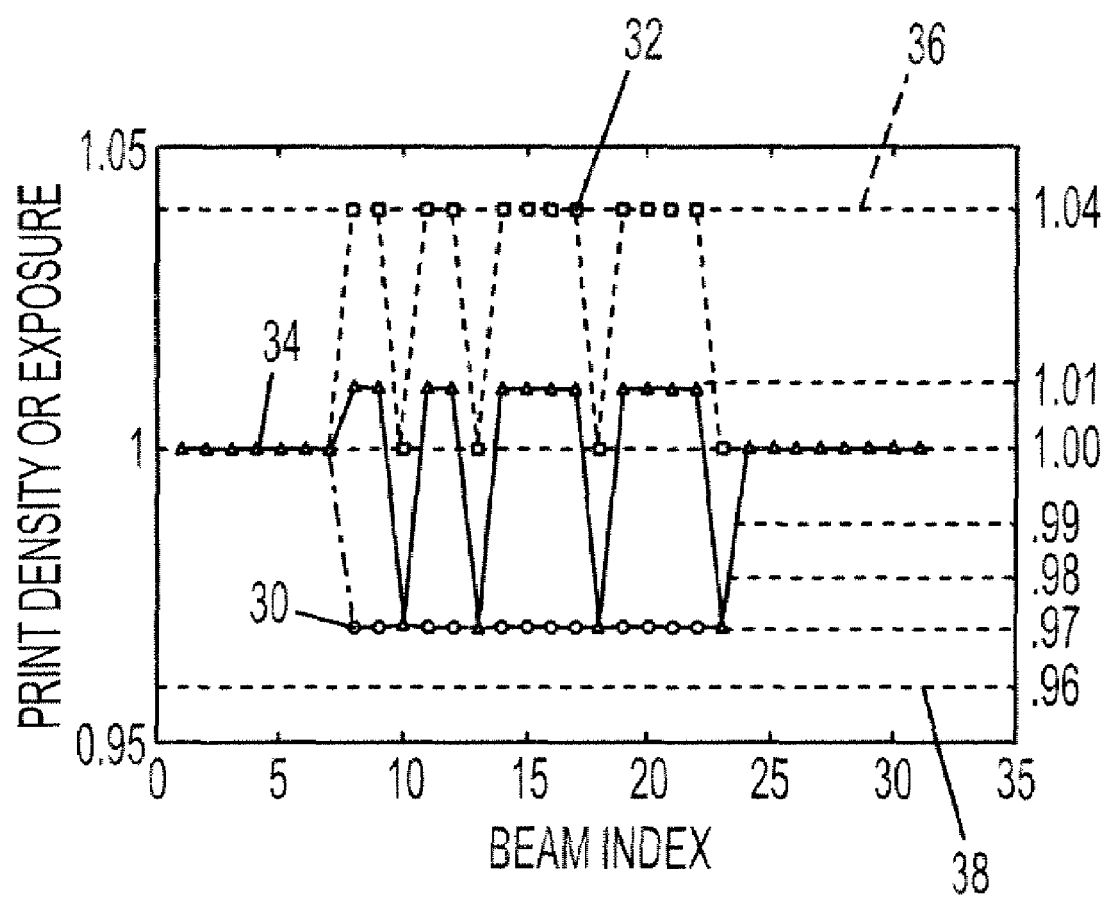
FIG. 3 displays the effect of low frequency compensation with exposure quantization at exemplary levels.

A simple illustration of print density is shown in FIG. 3. Line 30 plots the print density as a function of position, which follows the shape of a square wave. It would occur if ½ the VCSEL beams were too bright and the other ½ of the VCSEL beams were too dark. Lines 36, 38 show the quantized levels which the exposure can be adjusted between. The levels 36, 38 are so far apart that if the beam intensity was adjusted to the next quantized level it would overcompensate. Line 32 shows one possibility of adjustments that can improve the appearance of the image. Some of the beams are adjusted so that on average the correct exposure is obtained. This approach introduces some very high frequency noise (i.e. Line 34), but this noise is not perceptible.

In general, the N beams of the VCSEL ROS could have any exposure and any spacing variation which would give some high frequency banding. The banding would contain a fundamental frequency at the swath spacing and the high frequency harmonics. Without quantization, the fundamental frequency and all the higher harmonics could be eliminated. If there is the constraint of quantization, it is possible to eliminate the lower frequencies at the expense of changing the amplitude of the high frequencies. In general, there will be many possible solutions of exposure that will minimize the banding if it can be measured.

Figure 4:
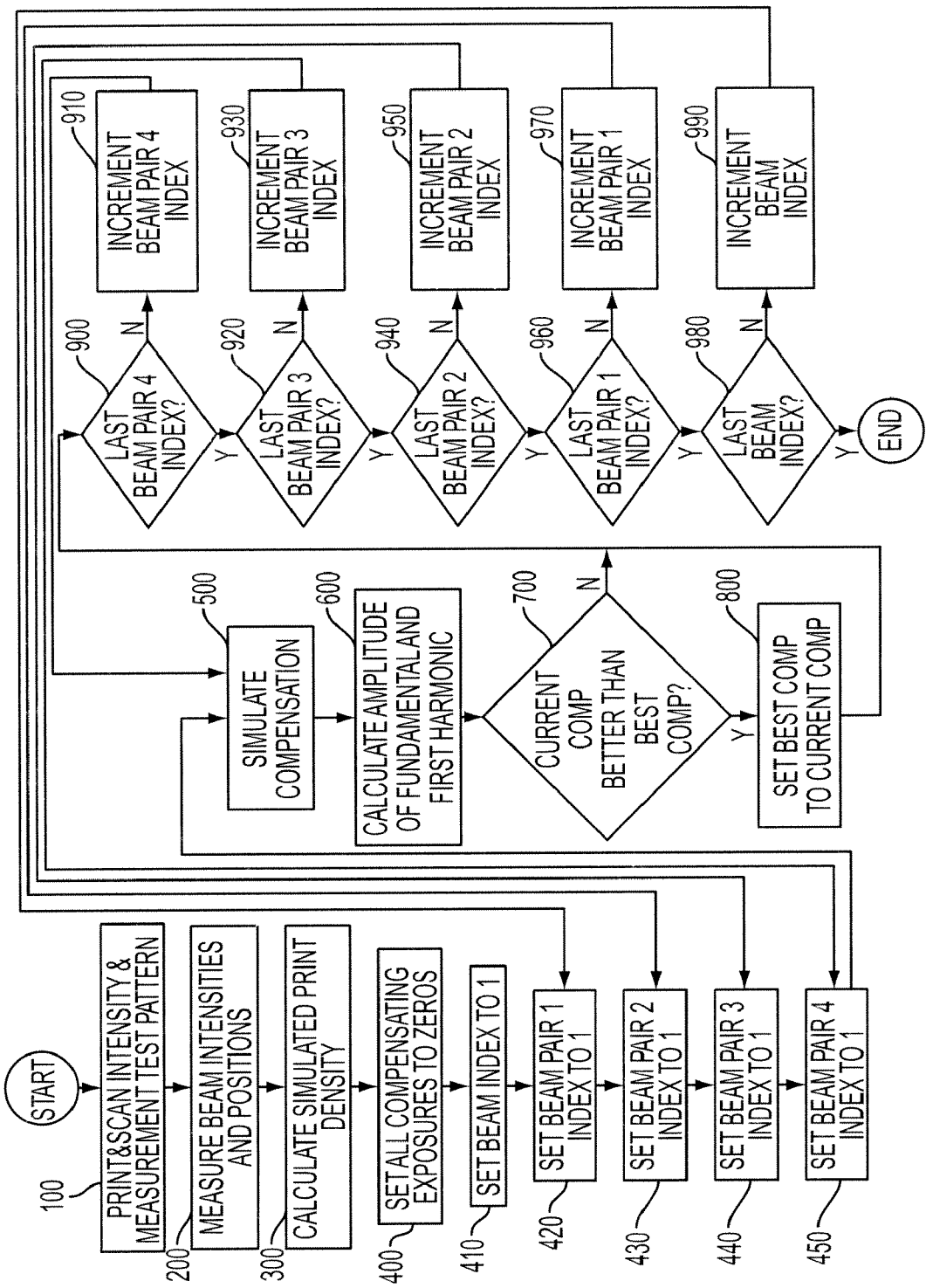
FIG. 4 is a flowchart describing one algorithm to compensate the banding from high addressable multiple beam laser systems.

In FIG. 4, a flowchart is therein displayed describing one algorithm to compensate the banding or phase of banding from high addressable multiple beam laser systems. In step 100, a test pattern is printed and scanned. The test pattern is designed so that the intensity and position of each beam can be determined. One design of the test pattern can consist of a large number of single pixel dashes, each dash printed by one of the VCSEL beams. A similar test pattern is described in U.S. Pat. No. 6,819,352, "Method of adjusting print uniformity" by Howard Mizes and Daniel Viassolo, and is herein incorporated by reference.

In step 200, the individual beam intensities are determined. The position of the centroid or center of each dash gives the relative position of an individual beam. The minimum reflectance of the dash gives the exposure of each particular beam. Many repeat measurements can minimize the noise.

In step 300, the banding profile and/or phase of banding is determined from the individual beam intensities and positions. This involves a calculation that translates the beam intensities as measured to how they would appear as printed. Two examples are described below.

In non-interlaced mode, each sweep of the swatch exposes a new area of the photoreceptor in sequence. The print density is assumed to be proportional to the intensity of the beam. In addition, the print density is assumed to be proportional to the spacing between neighboring beams. For small variations in the beam intensity and position, this assumption should be true.

In a interlaced mode, the movement of the photoreceptor between sweeps of the beam is less than the width of the swatch. Sweeps will then interlace previous sweeps. A calculation is then performed to identify which beam indices are neighbors of each other. Once this is done, the same assumptions about dependence on beam intensity and position can be applied.

If the number of beams and quantized exposure values of the VCSEL ROS were small, it would be possible to test all combinations of exposures for each beam and determine which best compensates the intrinsic banding. However, for a 31 beam ROS with 4 quantized values, there are $4^{31}$ possibilities. It would take too much time to test all these possibilities. Therefore, an assumption on the form the exposures should take can be made. In one example, combinations can be tested that occur in groups of 4, where each group is separated by 8 beams (set displacement) or a phase of $\pi/2$. This has the effect of testing changes in the exposure profile that introduce frequencies at the fundamental and the first harmonic, i.e. the frequencies to compensate.

Figure 5:
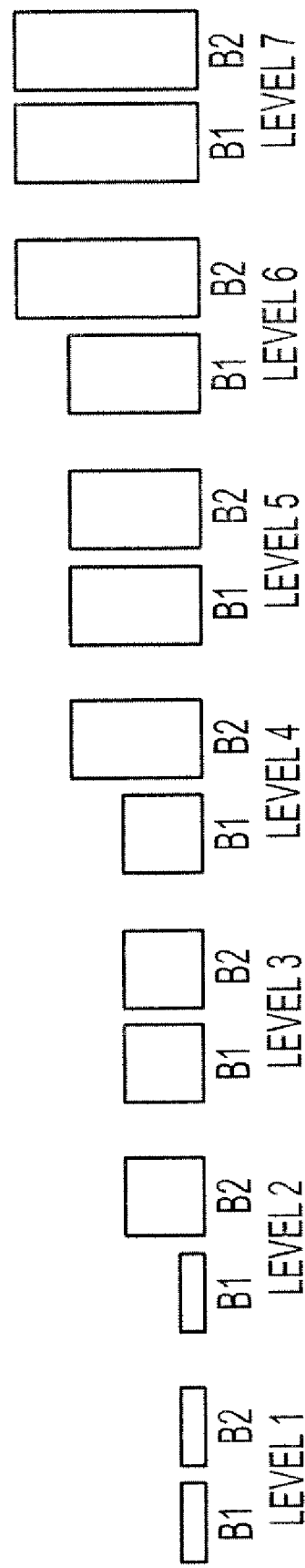
FIG. 5 displays, for example, the seven different exposure levels each beam pair can take if two beams are grouped and there are four quantized levels.
Figure 6:
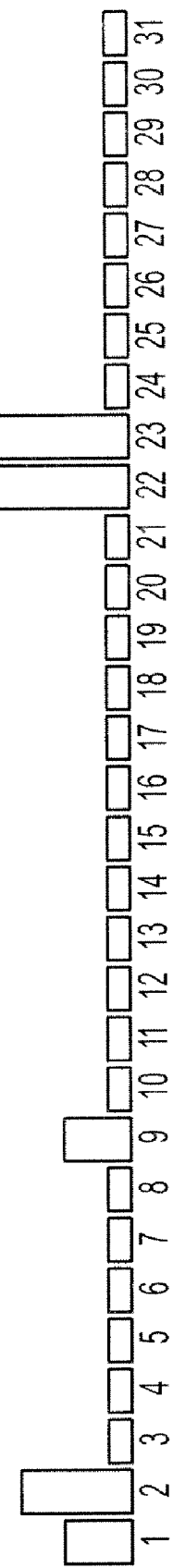
FIG. 6 displays one exemplary arrangement of exposure levels.

In order to get finer resolution on the exposure values tested, in one exemplary embodiment, a pair of two beams can be grouped into the group of 4 beams, although a larger number can be grouped together at the expense of more calculation time. FIG. 5 shows the 7 different exposure levels each beam pair can take if two beams are grouped and there are 4 quantized levels. For a fixed set of beams, all combinations of these 7 exposure levels can be tested. FIG. 6 shows one particular arrangement of the exposure levels. Testing all combinations requires testing only $4^7$ combinations, a much more manageable calculation.

Referring again to FIG. 4, steps 400 through 450 set up the indexing to test all these combinations. In step 500 the compensation is simulated. Specifically, each measured beam's intensity is modified by the intensity predicted if the beam intensity was changed. The prediction of the new intensity can be calibrated ahead of time by intentionally changing the beam intensity and measuring the change in the beam intensity on the printed test pattern. The new simulated print density can be made with the same calculation as in step 300.

In step 600, the Fourier transform is calculated of the simulated print density and the amplitude of the fundamental and first harmonic is also calculated. In general, the amplitude is extracted from all the low frequency terms of the Fourier expansion that is to be minimized.

In step 700, the amplitude of these components is compared to the lowest simulated amplitude that has been calculated up to this point. If the simulated amplitude of the low frequency components is the lowest observed so far, then the exposure settings are saved as the best current compensation in step 800

Steps 900 through 960 loop through all $4^9$ combinations of beam exposures to test. After all these combinations have been tested, the best set of exposures can be found for the particular beams shown in FIG. 6. In step 960, a shift of the beams to test is adjusted by 1 beam. For example, if beams 1, 2, 8, 9, 15, 16, 22, and 23 were tested in the first calculation, then beams 2, 3, 9, 10, 16, 17, 23, and 24 will be tested in the next loop (i.e. index). For a 31 beam ROS, the set of beams are changed 31 times using the 31 possible indices displayed in the exemplary table below, using the best set of exposures from the previous set (loop) each time. After the execution of this loop in step 980 31 times, an estimate of the best set of exposures for compensation (i.e. banding compensation metric) can be made and the calculation can end.

TABLE OF GROUP COMBINATIONS BEAM PAIR

| INDEX | 1 | | 2 | | 3 | | 4 | |
|---|---|---|---|---|---|---|---|---|
| 1 | 1 | 2 | 8 | 9 | 15 | 16 | 22 | 23 |
| 2 | 2 | 3 | 9 | 10 | 16 | 17 | 23 | 24 |
| 3 | 3 | 4 | 10 | 11 | 17 | 18 | 24 | 25 |
| 4 | 4 | 5 | 11 | 12 | 18 | 19 | 25 | 26 |
| 5 | 5 | 6 | 12 | 13 | 19 | 20 | 26 | 27 |
| 6 | 6 | 7 | 13 | 14 | 20 | 21 | 27 | 28 |
| 7 | 7 | 8 | 14 | 15 | 21 | 22 | 28 | 29 |
| 8 | 8 | 9 | 15 | 16 | 22 | 23 | 29 | 30 |
| 9 | 9 | 10 | 16 | 17 | 23 | 24 | 30 | 31 |
| 10 | 10 | 11 | 17 | 18 | 24 | 25 | 31 | 1 |
| 11 | 11 | 12 | 18 | 19 | 25 | 26 | 1 | 2 |
| 12 | 12 | 13 | 19 | 20 | 26 | 27 | 2 | 3 |
| 13 | 13 | 14 | 20 | 21 | 27 | 28 | 3 | 4 |
| 14 | 14 | 15 | 21 | 22 | 28 | 29 | 4 | 5 |
| 15 | 15 | 16 | 22 | 23 | 29 | 30 | 5 | 6 |
| 16 | 16 | 17 | 23 | 24 | 30 | 31 | 6 | 7 |
| 17 | 17 | 18 | 24 | 25 | 31 | 1 | 7 | 8 |
| 18 | 18 | 19 | 25 | 26 | 1 | 2 | 8 | 9 |
| 19 | 19 | 20 | 26 | 27 | 2 | 3 | 9 | 10 |
| 20 | 20 | 21 | 27 | 28 | 3 | 4 | 10 | 11 |
| 21 | 21 | 22 | 28 | 29 | 4 | 5 | 11 | 12 |
| 22 | 22 | 23 | 29 | 30 | 5 | 6 | 12 | 13 |
| 23 | 23 | 24 | 30 | 31 | 6 | 7 | 13 | 14 |
| 24 | 24 | 25 | 31 | 1 | 7 | 8 | 14 | 15 |
| 25 | 25 | 26 | 1 | 2 | 8 | 9 | 15 | 16 |
| 26 | 26 | 27 | 2 | 3 | 9 | 10 | 16 | 17 |
| 27 | 27 | 28 | 3 | 4 | 10 | 11 | 17 | 18 |
| 28 | 28 | 29 | 4 | 5 | 11 | 12 | 18 | 19 |
| 29 | 29 | 30 | 5 | 6 | 12 | 13 | 19 | 20 |
| 30 | 30 | 31 | 6 | 7 | 13 | 14 | 20 | 21 |
| 31 | 31 | 1 | 7 | 8 | 14 | 15 | 21 | 22 |
| 1 | 1 | 2 | 8 | 9 | 15 | 16 | 22 | 23 |

Figure 7:
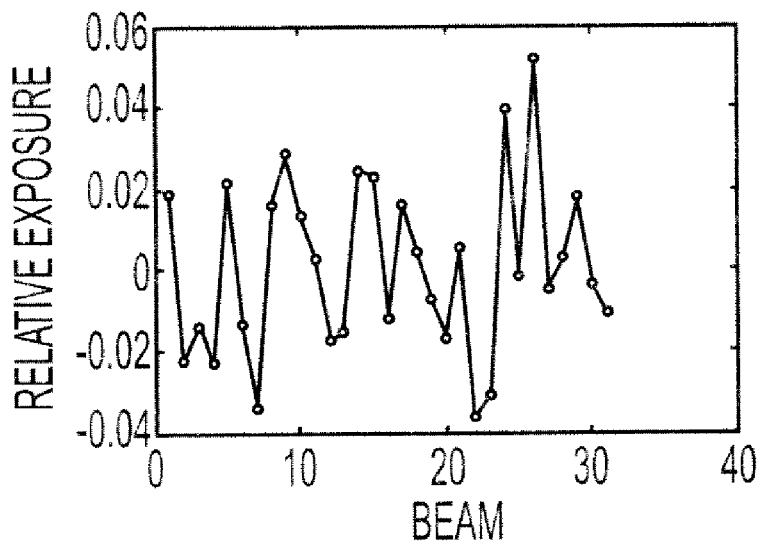
FIG. 7 displays an exposure variation of an exemplary VCSEL ROS.
Figure 8:
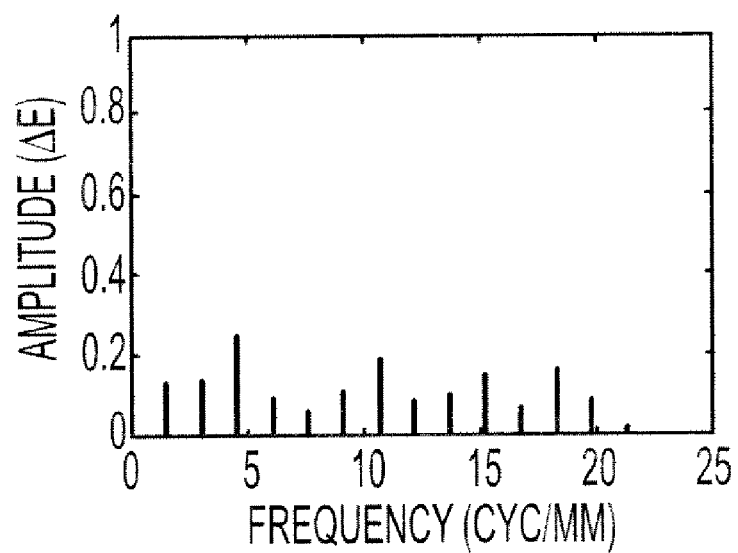
FIG. 8 displays the Fourier transform of a model print made with the exposure variation shown in FIG. 7.

FIG. 7 shows an exposure variation that might be typical of the current VCSEL ROS. This exposure variation was produced by picking beam intensities from a normal distribution with a standard deviation of 2%. FIG. 8 shows the Fourier transform of a model print made with this exposure variation. Noise is introduced at all frequencies. Note that the amplitude of the noise at 1.52 cycles/mm is only 0.1 ΔE.

Figure 9:
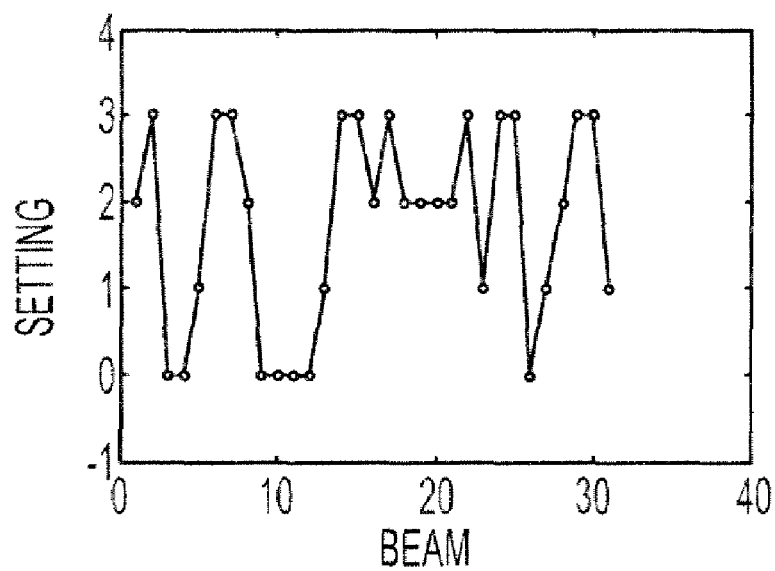
FIG. 9 displays the exposure settings that were produced as a set of exposures that compensate the low frequency noise; and, FIG. 10 displays the Fourier transform of a model print made with the exposure variation shown in FIG. 9.
Figure 10:
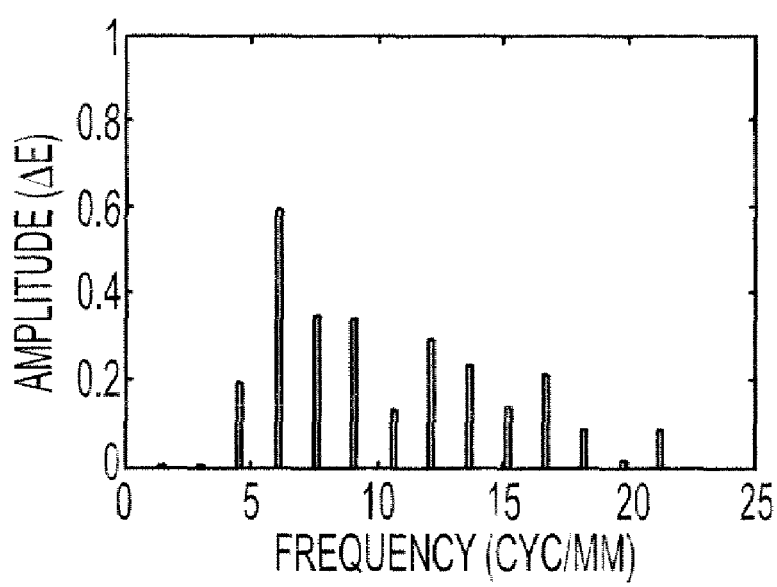

The beam to beam variation of FIG. 7 was put into the optimization model. The exposure settings shown in FIG. 9 were produced as a set of exposures that compensate the low frequency noise. A setting of zero means keep the beam at its nominal exposure. A setting of one means to decrease the beam intensity by 2%. A setting of two means to decrease the beam intensity by 4%. A setting of three means to decrease the beam intensity by 6%. Because of the only four levels of quantization, there is no apparent periodic signal in this exposure profile. When this exposure profile is added to the random exposures of FIG. 9, the resultant Fourier transform is shown in FIG. 10. The peaks at 1.52 cycles/mm and 3.04 cycles/mm have been eliminated. Therefore, the banding in a print can be improved significantly by adjusting the exposures.

It will be appreciated that variants of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
   (a) writing a test pattern using multiple image beams in a non image zone at set time intervals;
   (b) sensing said test pattern;
   (c) determining a profile of each beam from said multiple image beams;
   (d) determining a minimum reflectance of said profile from said test pattern of each said beam thereby providing an exposure of each respective said beam;
   (e) determining a centroid of a profile from said test pattern of each said beam thereby providing a position of each respective said beam;
   (f) determining at least one of frequency, amplitude and phase of banding, which is inherent in a printing device, based on the sensed test pattern;
   (g) combining a plurality of groups of image beams intensity changes wherein each group is separated by a set displacement;

(h) determining a banding profile from said group beam intensities;

(i) determining at least one banding compensation metric based at least on one of the determined frequency, amplitude and phase of banding; and, (j) adjusting beam intensity changes based on the determined banding compensation metric to compensate the banding inherent in the printing device.

2. The method of claim 1, wherein each of the plurality of groups of image beams includes one or more adjacent image beams.

3. The method of claim 2, wherein a set of adjacent image beams of the plurality of groups of image beams is separated by a fixed number of beams chosen to give the desired compensating banding frequency.

4. The method of claim 3, wherein a first, second, third, and fourth pair of image beams occurs at an initial reference beam.

5. The method of claim 4, further including (k) simulating a compensation and calculating amplitude of fundamental and higher order harmonics.

6. The method of claim 5, further including (l) comparing current compensation with best compensation.

7. The method of claim 6, further including (m) setting the best compensation to the current compensation.

8. The method of claim 7, further including (n) incrementing the first, second, third, and fourth pair of image beams to another set of quantized exposure levels.

9. The method of claim 8, further including (o) incrementing the first, second, third, and fourth pair of image beams to a second index.

10. The method of claim 9, further including:
repeating (g) thru (o);
determining a change in at least one of the amplitude and phase of each determined banding frequency;
updating at least one of the estimated amplitude and phase of each banding frequency;
determining at least one updated beam exposure setpoints based on at least one of the updated amplitude and phase; and,
adjusting the beam exposure setpoints to compensate the banding inherent in the printing device based on one or more updated banding compensation parameters.

11. The method of claim 9, wherein repeating (e) thru (m) is conducted thirty-one (31) times.

12. A method comprising:
(a) writing a test pattern using multiple image beams in a non image zone at set time intervals;
(b) sensing the test pattern;
(c) determining a profile of each beam from said multiple image beams;
(d) determining a minimum reflectance of a profile from said test pattern of each said beam thereby providing an exposure of each respective said beam;

(e) determining a centroid of a profile from said test pattern of each said beam thereby providing a position of each respective said beam;

(f) determining at least one of frequency, amplitude and phase of banding which is inherent in a printing device, based on the sensed test pattern;

(g) combining a plurality of groups of image beams intensity changes wherein each group is separated by a set displacement;

(h) determining a banding profile from said group beam intensities;

(i) determining at least one banding compensation metric based on at least one of the determined frequency, amplitude and phase of banding, wherein each compensation metric is one of four different exposures; and (j) adjusting characteristics of producing an image based on the determined banding compensation parameter to compensate the banding inherent in the printing device.

13. The method of claim 12, wherein each of the plurality of groups of image beams includes a pair of adjacent image beams.

14. The method of claim 13, wherein each pair of adjacent image beams of the plurality of groups of image beams is separated by eight (8) beams.

15. The method of claim 14, wherein a first, second, third, and fourth pair of image beams includes an index of one (1).

16. The method of claim 15, further including (k) simulating a compensation and calculating amplitude of fundamental and first harmonic.

17. The method of claim 16, further including (i) comparing current compensation with best compensation.

18. The method of claim 17, further including (m) setting the best compensation to the current compensation.

19. The method of claim 18, further including (n) incrementing the first, second, third, and fourth pair of image beams to a second index.

20. The method of claim 19, further including:
repeating (e) thru (n);
determining a change in at least one of the amplitude and phase of each determined banding frequency;
updating at least one of the estimated amplitude and phase of each banding frequency;
determining at least one updated banding compensation parameter based on at least one of the updated amplitude and phase; and,
adjusting the exposure level between characteristics of producing the image to compensate the banding inherent in the printing device based on one or more updated banding compensation parameters, wherein the exposure level is selected from the group consisting of 0%, 2%, 4%, and 6%.

* * * * *